United States Patent
Mizobuchi et al.

(10) Patent No.: US 12,332,482 B2
(45) Date of Patent: Jun. 17, 2025

(54) OPTICAL MEMBER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Yujiro Mizobuchi, Nisshin (JP); Hiroshi Ando, Nisshin (JP); Kazuyuki Ishihara, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 304 days.

(21) Appl. No.: 18/178,089

(22) Filed: Mar. 3, 2023

(65) Prior Publication Data
US 2023/0367070 A1 Nov. 16, 2023

(30) Foreign Application Priority Data
May 10, 2022 (JP) .................................. 2022-077697

(51) Int. Cl.
G02B 6/26 (2006.01)
B60R 1/12 (2006.01)

(52) U.S. Cl.
CPC .............. *G02B 6/26* (2013.01); *B60R 1/1207* (2013.01)

(58) Field of Classification Search
None
See application file for complete search history.

(56) References Cited

U.S. PATENT DOCUMENTS

| | | | |
|---|---|---|---|
| 2003/0169160 A1* | 9/2003 | Rodriguez Barros | ...................... B60Q 1/2665 340/426.1 |
| 2014/0009463 A1 | 1/2014 | Watanabe et al. | |
| 2020/0317131 A1* | 10/2020 | Schmierer | ................. B60R 1/12 |
| 2022/0082854 A1 | 3/2022 | Takahashi et al. | |

FOREIGN PATENT DOCUMENTS

JP 2015-143087 A 8/2015

* cited by examiner

*Primary Examiner* — Tina Wong
(74) *Attorney, Agent, or Firm* — Posz Law Group, PLC

(57) ABSTRACT

An optical member includes a light guide. An inclination angle of a first reflecting surface of the light guide with respect to a first direction perpendicular to a normal direction of the first reflecting surface is defined as $\gamma r$ in a rotational direction about an axis extending in the normal direction. A line segment is defined by connecting the viewer and the light guide in a cross section perpendicular to the first direction. An inclination angle of the line segment with respect to a second direction perpendicular to the normal direction and the first direction is defined as $\beta$ in a rotational direction about an axis extending in the first direction. The first reflecting surface is formed so as to satisfy Inequation of $10° \leq \arctan(\tan \gamma r \times \sin \beta) \leq 90°$.

11 Claims, 12 Drawing Sheets

FIG. 12
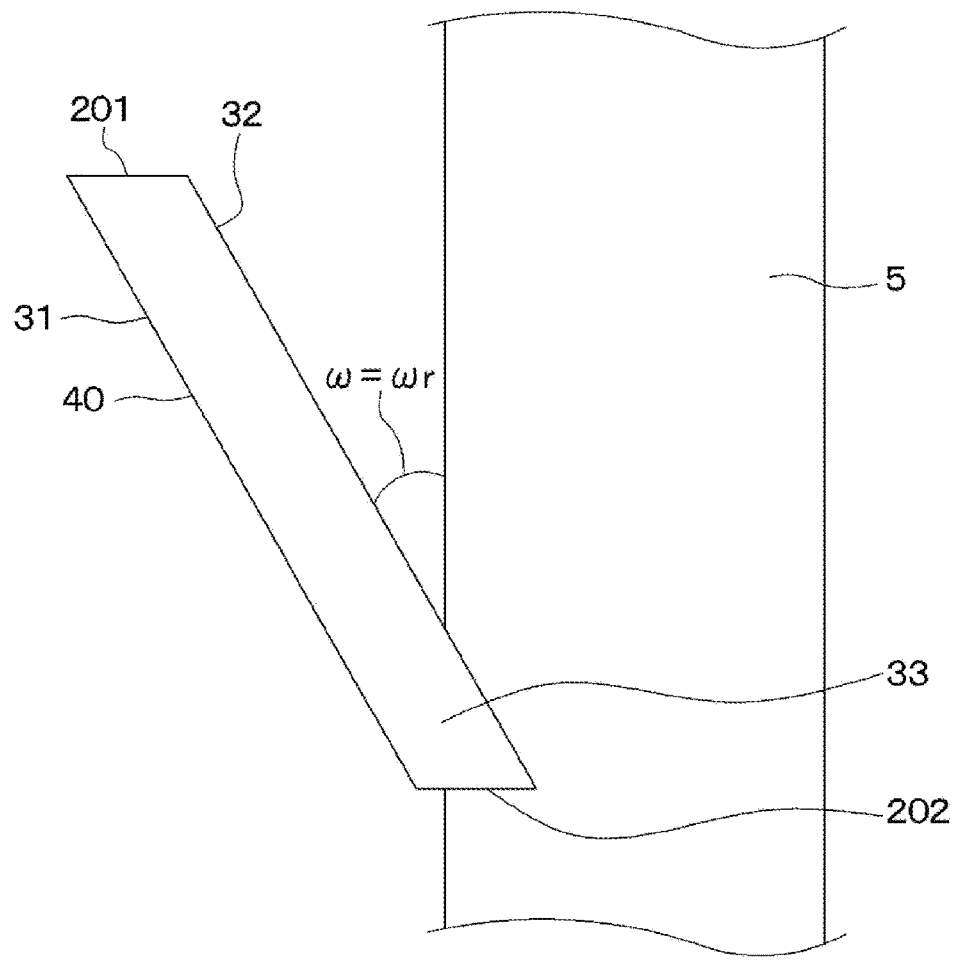
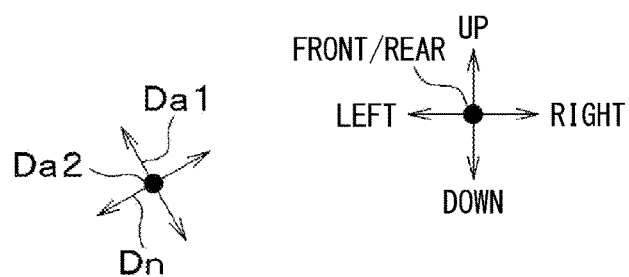

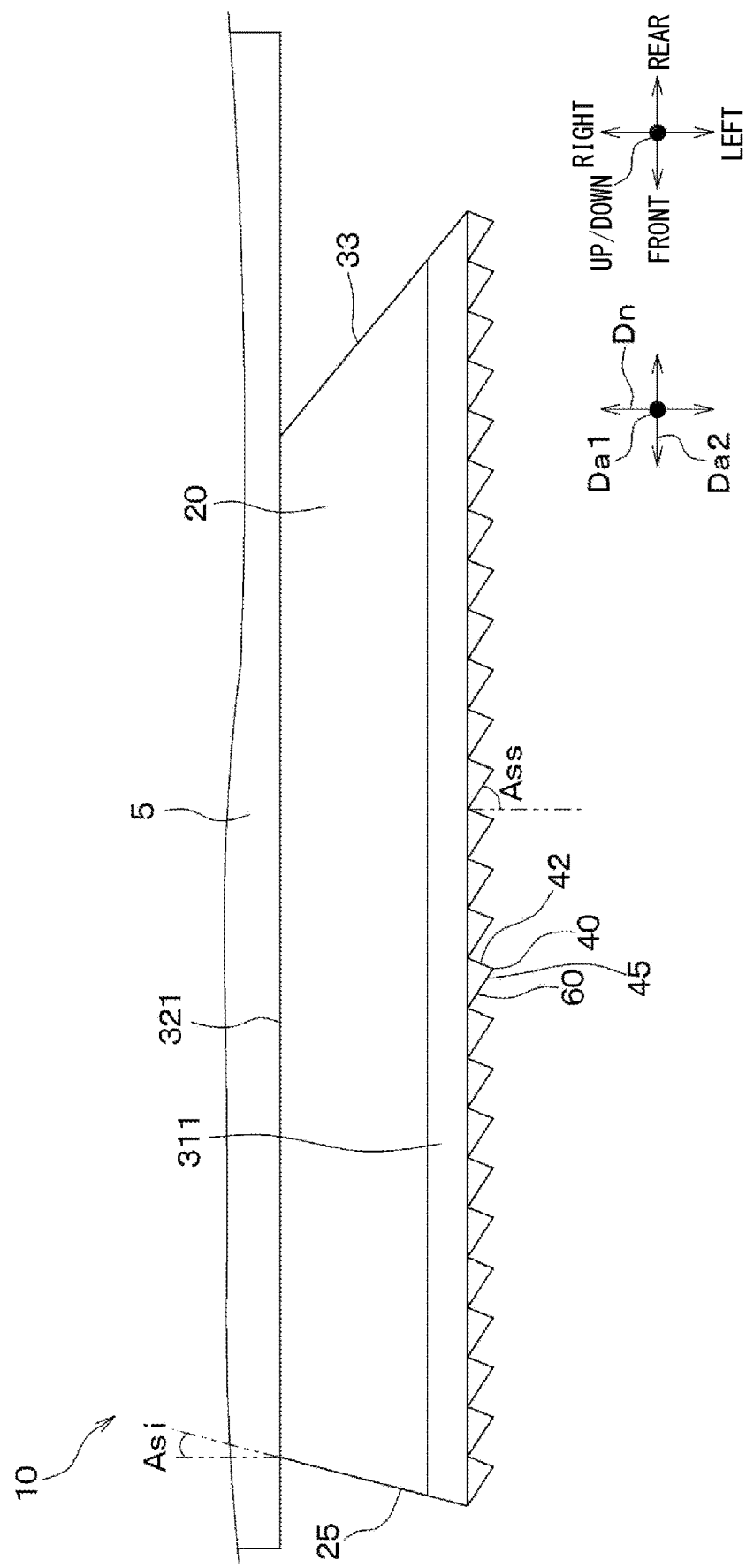

OPTICAL MEMBER

CROSS REFERENCE TO RELATED APPLICATION

This application is based on Japanese Patent Application No. 2022-077697 filed on May 10, 2022, the disclosure of which is incorporated herein by reference.

TECHNICAL FIELD

The present disclosure relates to an optical member.

BACKGROUND

A blind spot assistance device includes a semi-transmissive mirror, a mirror that reflects light to the semi-transmissive mirror, a translucent member provided between the semi-transmissive mirror and the mirror, and a prism provided between the semi-transmissive mirror and the viewer.

SUMMARY

According to the first aspect of the present disclosure, an optical member includes a light guide. The light guide has: an incident surface on which an external scene light is incident from a blind area; a first reflecting surface configured to reflect light from the incident surface; a second reflecting surface configured to reflect light reflected by the first reflecting surface; an exit portion that emits the light from the incident surface and the light reflected by the second reflecting surface to outside; a first rough surface cross-connected with the incident surface, the first reflecting surface, and the second reflecting surface; and a second rough surface cross-connected with the first reflecting surface and the second reflecting surface, the second rough surface being located opposite to the first rough surface. A first direction is defined from the first rough surface to the second rough surface and perpendicular to a normal direction of the first reflecting surface. A second direction is perpendicular to the normal direction and the first direction. The exit portion is one of a plurality of exit portions arranged at a predetermined interval in the second direction. The first reflecting surface is defined between the exit portions adjacent to each other, and the first reflecting surface is one of a plurality of first reflecting surfaces arranged at a predetermined interval in the second direction. An inclination angle γr of the first reflecting surface with respect to the first direction is defined in a rotational direction about an axis extending in the normal direction. A line segment is defined by connecting a viewer and the light guide in a cross section perpendicular to the first direction. An inclination angle β of the line segment with respect to the second direction is defined in a rotational direction about an axis extending in the first direction. The first reflecting surface is formed so as to satisfy Inequality of $10° \leq \arctan(\tan \gamma r \times \sin \beta) \leq 90°$.

BRIEF DESCRIPTION OF DRAWINGS

FIG. 12 is a side view of an optical member according to a third embodiment;
and
FIG. 13 is a schematic view of an optical member according to a fourth embodiment.

DETAILED DESCRIPTION

Figure 1:
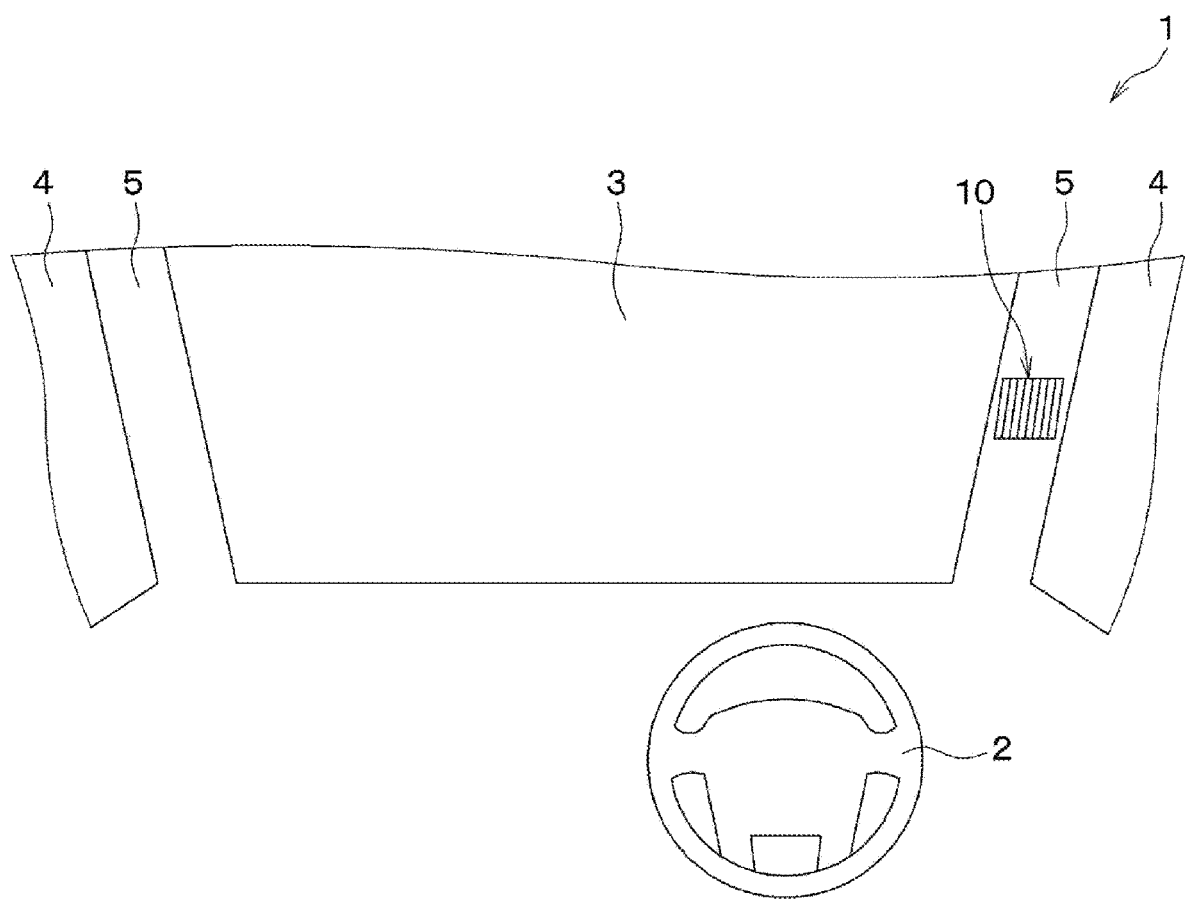
FIG. 1 is a configuration diagram of a vehicle including an optical member according to a first embodiment.

Conventionally, a blind spot assistance device includes a semi-transmissive mirror, a mirror, a translucent member, and a prism. The semi-transmissive mirror is provided to face the viewer. The mirror reflects light to the semi-transmissive mirror. The translucent member is provided between the semi-transmissive mirror and the mirror. The prism is provided between the semi-transmissive mirror and the viewer. The prism extends in the up-down direction and the prisms are arranged in the left-right direction. Each of the prisms has a light shielding layer on a surface that does not face the light incident surface of the translucent member. The light shielding layer shields light incident from the viewer side.

According to studies by the inventors, in the blind spot assistance device, since the prisms extend in the up-down direction and are arranged in the left-right direction, the light shielding layers also extend in the up-down direction and are arranged in the left-right direction. In case where the light shielding layer is made of, for example, a black resin, if a viewer looks at the blind spot assistance device, the light shielding layers look like black streaks extending in the up-down direction and arranged in the left-right direction.

In case where the viewer sees the scenery, if there are such periodic streaks of the up-down direction at a different distance from the scenery, the human visual processing will fuse to the streaks, since the viewer's eyes are on the left and right. Therefore, the attractiveness, which is the ease with which the viewer can recognize the streaks, increases. In other words, the streaks inhibit the recognition of the scenery by the viewer with the left and right vision. In addition, since moiré generated by the vertical streaks of the periodic structure moves due to the lateral movement of eyes of the viewer, the attractiveness is increased. Thus, recognition of the scene in the blind spot area reflected by the blind spot assistance device is lowered, and the visibility of the scene in the blind spot area is lowered.

In addition, according to the study by the inventors, the number of components for the blind spot assistance device increases, since the blind spot assistance device is provided with the semi-transmissive mirror having the dielectric multilayer and the like. For this reason, since the cost of the blind spot assistance device increases, it is desired that the blind spot assistance device does not include a semi-transmissive mirror in order to reduce the cost of the blind spot assistance device.

In order to restrict the blind spot assistance device from having a semi-transmissive mirror, it is conceivable to reflect the light on the surface of the light guide formed between the prisms instead of the semi-transmissive mirror. However, in this case, since the prisms extend in the up-down direction and are arranged in the left-right direction, the reflecting surfaces also extend in the up-down direction and are arranged in the left-right direction. At this time, the reflecting surfaces looks like streaks extending in the up-down direction and arranged in the left-right direction. Therefore, the reflecting surfaces increase the eye-attractiveness, which is the ease with which the viewer can recognize the streaks, in the same manner as described above. As a result, recognition of the scene in the blind spot area reflected by the blind spot assistance device is lowered, and the visibility of the scene in the blind spot area is lowered.

The present disclosure provides an optical member that suppresses deterioration in recognition of sight in a blind spot area.

According to the first aspect of the present disclosure, an optical member to be attached to a mounting member includes a light guide. The light guide has: an incident surface on which an external scene light is incident from a blind area; a first reflecting surface configured to reflect light from the incident surface; a second reflecting surface configured to reflect light reflected by the first reflecting surface; an exit portion that emits the light from the incident surface and the light reflected by the second reflecting surface to outside; a first rough surface cross-connected with the incident surface, the first reflecting surface, and the second reflecting surface; and a second rough surface cross-connected with the first reflecting surface and the second reflecting surface. The second rough surface is located opposite to the first rough surface. A first direction is defined from the first rough surface to the second rough surface and perpendicular to a normal direction of the first reflecting surface. A second direction is perpendicular to the normal direction and the first direction. The exit portion is one of a plurality of exit portions arranged at a predetermined interval in the second direction. The first reflecting surface is defined between the exit portions adjacent to each other, and the first reflecting surface is one of a plurality of first reflecting surfaces arranged at a predetermined interval in the second direction. An inclination angle γr of the first reflecting surface with respect to the first direction is defined in a rotational direction about an axis extending in the normal direction. A line segment Lb is defined by connecting a viewer and the light guide in a cross section perpendicular to the first direction. An inclination angle β of the line segment Lb with respect to the second direction is defined in a rotational direction about an axis extending in the first direction. The first reflecting surface is formed so as to satisfy Inequation of 10°≤arctan(tan γr×sin β)≤90°.

According to the second aspect of the present disclosure, an optical member to be attached to a mounting member includes a light guide. The light guide has: an incident surface on which an external scene light is incident from a blind area; a first reflecting surface configured to reflect light from the incident surface; a second reflecting surface configured to reflect light reflected by the first reflecting surface; an exit portion having an exit surface that emits the light from the incident surface and the light reflected by the second reflecting surface to outside and a non-exit surface connected to the exit surface; a first rough surface cross-connected with the incident surface, the first reflecting surface, and the second reflecting surface; a second rough surface cross-connected with the first reflecting surface and the second reflecting surface, the second rough surface being located opposite to the first rough surface; and a light shielding portion covering the non-exit surface to shield light directed toward the exit portion from outside of the light guide. A first direction is defined from the first rough surface to the second rough surface and perpendicular to a normal direction of the first reflecting surface. A second direction is perpendicular to the normal direction and the first direction. The exit portion is one of a plurality of exit portions arranged in the second direction. The light shielding portion covering the non-exit surface is one of a plurality of light shielding portions arranged in the second direction. An inclination angle γ of the non-exit surface and the light shielding portion with respect to the first direction is defined in a rotational direction about an axis extending in the normal direction. A line segment Lb is defined by connecting a viewer and the light guide in a cross section perpendicular to the first direction. An inclination angle β of the line segment Lb with respect to the second direction is defined in a rotational direction about an axis extending in the first direction. The non-exit surface and the light shielding portion are formed so as to satisfy Inequation of 10°≤arctan(tan γ×sin β)≤90°.

According to the third aspect of the present disclosure, an optical member to be attached to a mounting member includes a light guide. The light guide has: an incident surface on which an external scene light is incident from a blind area; a first reflecting surface configured to reflect light from the incident surface; a second reflecting surface configured to reflect light reflected by the first reflecting surface; an exit portion that emits the light from the incident surface and the light reflected by the second reflecting surface to outside; a first rough surface cross-connected with the incident surface, the first reflecting surface, and the second reflecting surface; and a second rough surface cross-connected with the first reflecting surface and the second reflecting surface. The second rough surface is located opposite to the first rough surface. A first direction is defined from the first rough surface to the second rough surface and perpendicular to a normal direction of the first reflecting surface. The exit portion is one of a plurality of exit portions arranged at a predetermined interval in the second direction. The first reflecting surface is defined between the exit portions adjacent to each other, and the first reflecting surface is one of a plurality of first reflecting surfaces arranged at a predetermined interval in the second direction.

An inclination angle ωr of the first reflecting surface with respect to an up-down direction is defined in a rotational direction about an axis extending in a front-rear direction of a viewer. An inclination angle γr of the first reflecting surface with respect to the up-down direction is defined in a rotational direction about an axis extending in a left-right direction of the viewer. A line segment Lb is defined by connecting the viewer and the light guide in a cross section perpendicular to the up-down direction. An inclination angle β of the line segment Lb with respect to the front-rear direction is defined in a rotational direction about an axis extending in the up-down direction. The first reflecting surface is formed so as to satisfy the following formulas (3-1), (3-2) and (3-3).

$$Sr = \sqrt{\tan^2 \omega r + \tan^2 \gamma r} \tag{3-1}$$

$$\Delta r = \arctan\left(\frac{\tan \omega r}{\tan \gamma r}\right) - \beta \tag{3-2}$$

-continued $$10° \leq \arctan(Sr \times \sin\Delta r) \leq 90° \quad (3-3)$$

According to the fourth aspect of the present disclosure, an optical member to be attached to a mounting member includes a light guide. The light guide has: an incident surface on which an external scene light is incident from a blind area; a first reflecting surface configured to reflect light from the incident surface; a second reflecting surface configured to reflect light reflected by the first reflecting surface; an exit portion having an exit surface that emits the light from the incident surface and the light reflected by the second reflecting surface to outside and a non-exit surface connected to the exit surface; a first rough surface cross-connected with the incident surface, the first reflecting surface, and the second reflecting surface; a second rough surface cross-connected with the first reflecting surface and the second reflecting surface, the second rough surface being located opposite to the first rough surface; and a light shielding portion covering the non-exit surface to shield light directed toward the exit portion from outside of the light guide. A first direction is defined from the first rough surface to the second rough surface and perpendicular to a normal direction of the first reflecting surface. A second direction is perpendicular to the normal direction and the first direction. The exit portion is one of a plurality of exit portions arranged in the second direction. The light shielding portion covering the non-exit surface is one of a plurality of light shielding portions arranged in the second direction.

An inclination angle ω of the non-exit surface and the light shielding portion with respect to an up-down direction is defined in a rotational direction about an axis extending in a front-rear direction of a viewer. An inclination angle γ of the non-exit surface and the light shielding portion with respect to the up-down direction is defined in a rotational direction about an axis extending in a left-right direction of the viewer. A line segment Lb is defined by connecting the viewer and the light guide in a cross section perpendicular to the up-down direction. An inclination angle β of the line segment Lb with respect to the front-rear direction is defined in a rotational direction about an axis extending in the up-down direction. The non-exit surface and the light shielding portion are formed so as to satisfy the following formulas (4-1), (4-2) and (4-3).

$$S = \sqrt{\tan^2\omega + \tan^2\gamma} \quad (4-1)$$

$$\Delta = \arctan\left(\frac{\tan\omega}{\tan\gamma}\right) - \beta \quad (4-2)$$

$$10° \leq \arctan(S \times \sin\Delta) \leq 90° \quad (4-3)$$

Accordingly, when the viewer sees the light guide, the streaks generated in the optical member appear tilted. Since the enhancement of the streaks is suppressed, the eye-attractiveness is lowered. Therefore, deterioration in recognition of the scene in the blind area reflected on the optical member is suppressed.

A reference numeral attached to each component or the like indicates an example of correspondence between the component or the like and specific component or the like described in embodiments below.

Hereinafter, embodiments will be described with reference to the drawings. In the following embodiments, portions that are mutually the same or equivalent are denoted by the same reference signs, and the description thereof will be omitted.

First Embodiment

An optical member 10 of this embodiment is used in, for example, a vehicle 1. As shown in FIG. 1, the vehicle 1 includes a steering wheel 2, a windshield 3, a side window 4, a pillar 5, and the optical member 10. The optical member 10 is attached to, for example, the pillar 5, and guides an external scene light Lo from a blind spot area, due to the pillar 5, to the occupant of the vehicle 1, so that the sight of the blind spot area can be seen by the occupant of the vehicle 1. Note that the occupant of the vehicle 1 corresponds to a viewer. The pillar 5 corresponds to a mounting member.

Specifically, as shown in FIGS. 2 to 6, the optical member 10 includes a light guide 20 and a light shielding layer 60. The cross-sectional hatching of the optical member 10 is omitted for easy understanding in FIG. 2 and cross-sectional views described later.

The light guide 20 is made of a translucent material such as glass or resin material, for example, polyethylene terephthalate, polycarbonate, polyethylene or acrylic. The light guide 20 has an incident surface 25, a first reflecting surface 31, a second reflecting surface 32, a connecting surface 33, prisms 40, a first rough surface 201 and a second rough surface 202.

The external scene light Lo is incident on the incident surface 25. The first reflecting surface 31 is arranged to face the occupant of the vehicle 1 and intersects the incident surface 25. The light from the incident surface 25 is reflected on the first reflecting surface 31. The second reflecting surface 32 is connected to the incident surface 25 on the side opposite to the first reflecting surface 31 and parallel to the first reflecting surface 31. The light reflected by the first reflecting surface 31 is reflected by the second reflecting surface 32. The connecting surface 33 is located on the opposite side of the incident surface 25 and is cross-connected to the first reflection surface 31 and the second reflecting surface 32.

A direction of the normal passing through the first reflecting surface 31 is defined as the normal direction Dn. The normal direction Dn coincides with the left-right direction of the viewer.

Figure 2:
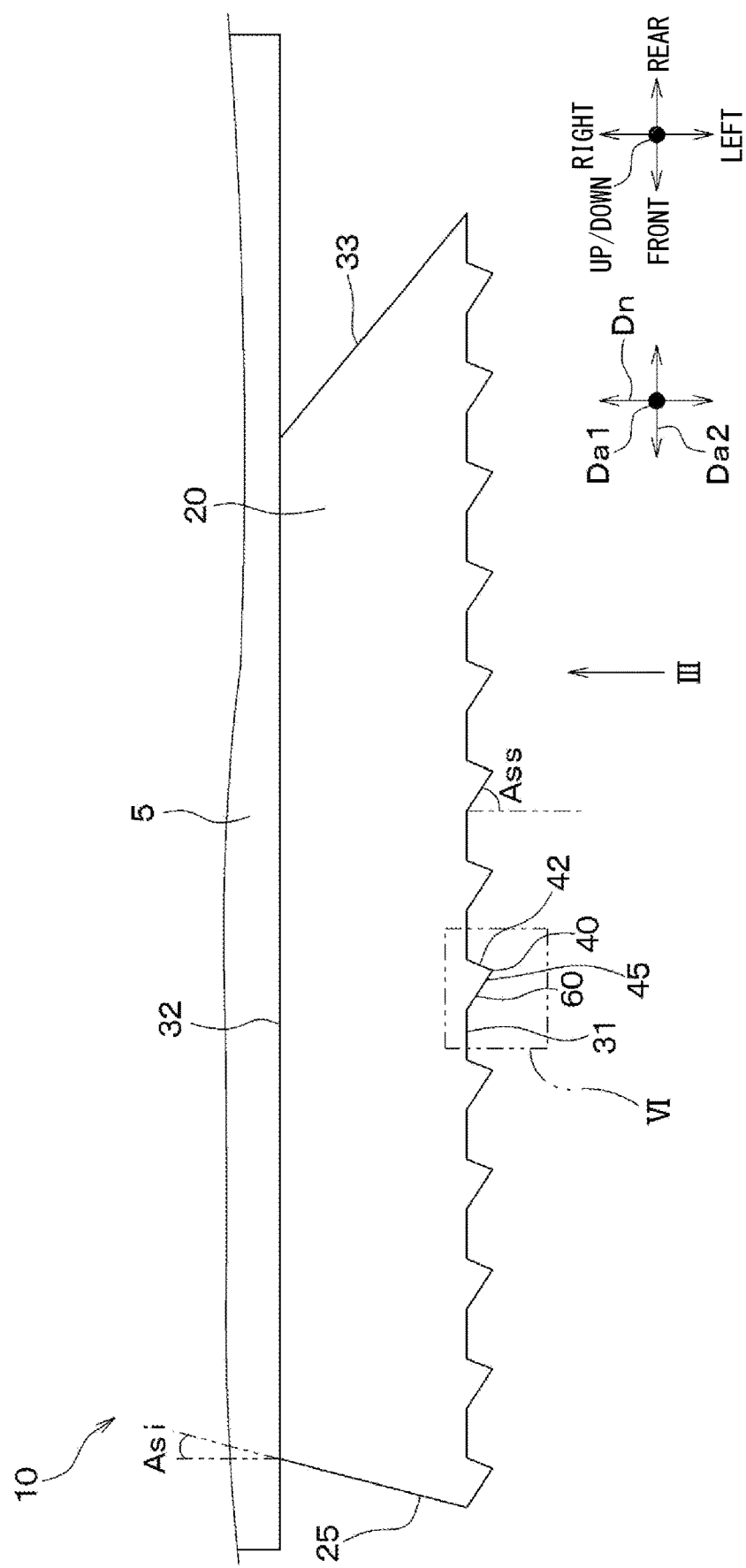
FIG. 2 is a cross-sectional view of the optical member.

As shown in FIG. 2, the incident surface 25 is inclined with respect to the normal direction Dn. An incident surface angle Asi, which is the inclination angle of the incident surface 25 with respect to the normal direction Dn, is an acute angle. The light guide 20 is defined to have a refractive index n1. The external medium of the light guide 20 is defined to have a refractive index n2. The incident angle when the light from the incident surface 25 is reflected by the first reflecting surface 31 and the incident angle when the light reflected by the first reflecting surface 31 is reflected by the second reflecting surface 32 are defined as θi. At this time, the light guide 20 is formed so as to satisfy the following (Formula 1-1). As a result, the light from the incident surface 25 is totally reflected by the first reflecting surface 31 and the second reflecting surface 32 even while the light guide 20 does not have a semi-transmissive mirror.

(Formula 1 − 1)

$$\sin\theta i \geq \frac{n2}{n1} \quad (1-1)$$

The prism 40 is formed by molding, cutting, blasting, etc., or a combination thereof when the light guide 20 is formed. The prism 40 protrudes from the first reflecting surface 31 and is formed in a triangular prism shape. The prisms 40 are arranged at a predetermined interval, and the first reflecting surface 31 is formed between the prisms 40 adjacent to each other. The first reflecting surfaces 31 are arranged at a predetermined interval in the arrangement direction of the prisms 40. The prism 40 corresponds to an exit portion and includes a prism exit surface 42 and a prism light shielding surface 45.

The prism exit surface 42 is connected to the first reflecting surface 31. The prism exit surface 42 is parallel to the incident surface 25. Therefore, the prism exit surface 42 is inclined at the incident surface angle Asi with respect to the normal direction Dn.

The prism light shielding surface 45 corresponds to a non-exit surface and is cross-connected with the prism exit surface 42. The prism light shielding surface 45 is inclined at a light shielding surface angle Ass with respect to the normal direction Dn.

Figure 3:
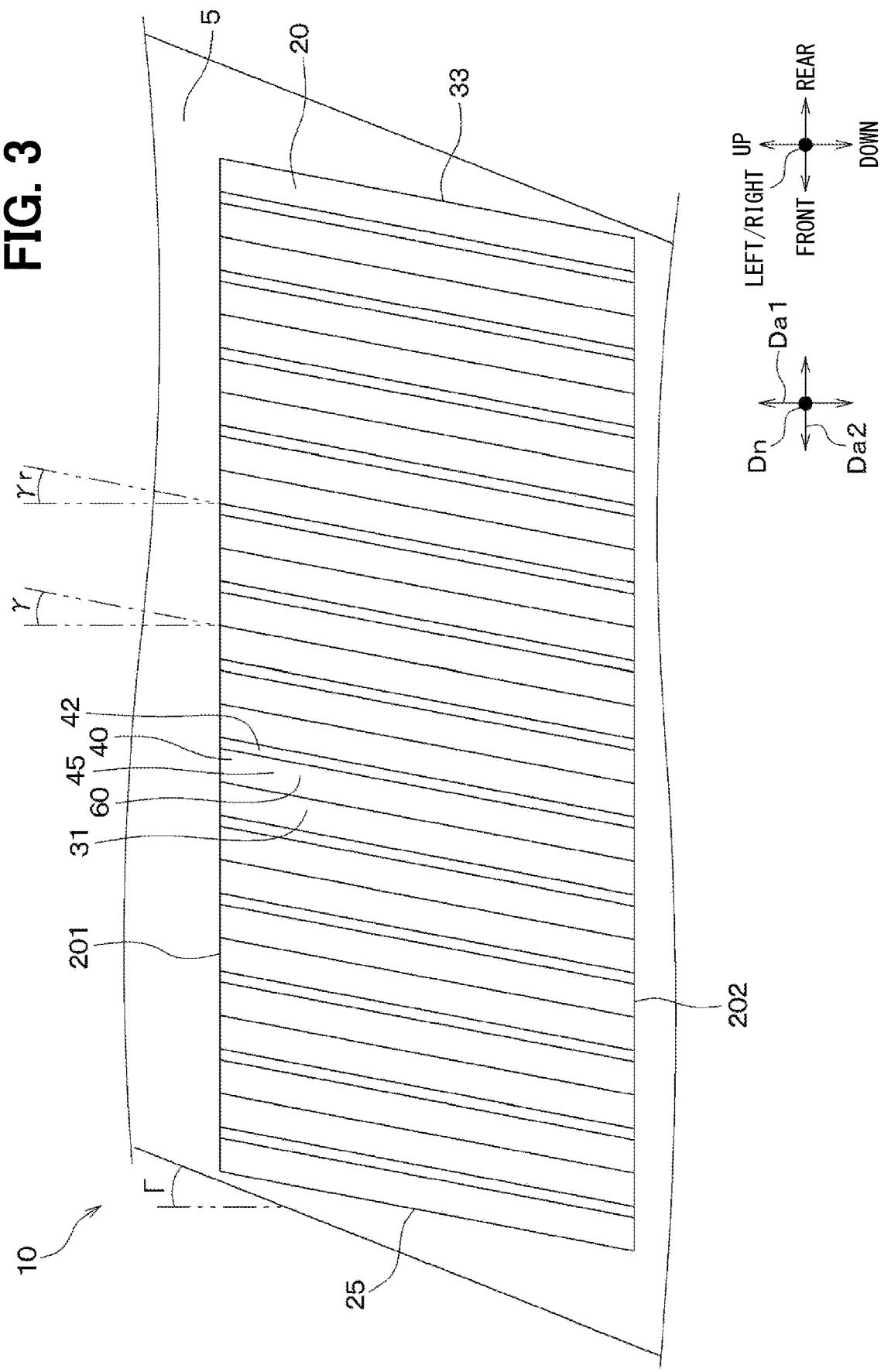
FIG. 3 is a view seen in an arrow direction III in FIG. 2.

As shown in FIG. 3, the first rough surface 201 is cross-connected with the incident surface 25, the first reflecting surface 31 and the second reflecting surface 32. The second rough surface 202 is arranged on the opposite side of the first rough surface 201. The second rough surface 202 opposes the first rough surface 201, and is cross-connected with the incident surface 25, the first reflecting surface 31, and the second reflecting surface 32. The surface roughness of the first rough surface 201 and the second rough surface 202 is larger than the surface roughness of the incident surface 25, the first reflecting surface 31 and the second reflecting surface 32. This makes it difficult for light to be reflected by the first rough surface 201 and the second rough surface 202. The surface roughness is, for example, a root mean square height, the maximum peak height, the maximum valley height, the maximum height, the calculated average height, etc., and is measured by a measurement method conforming to ISO25178 and JISB0601.

Figure 4:
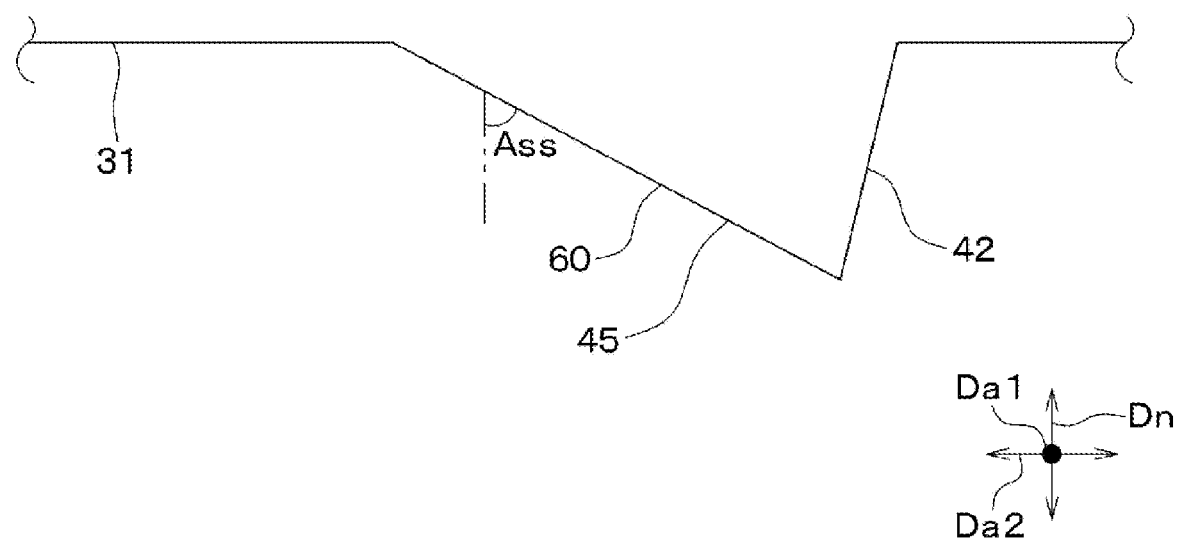
FIG. 4 is an enlarged view of an area VI in FIG. 2.

The light shielding layer 60 corresponds to a light shielding portion, and is made of a light absorption film that absorbs 99% or more of light. The light shielding layer 60 is formed of, for example, a black resin by coating, printing, vapor deposition, or the like. As shown in FIG. 4, the light shielding layer 60 covers the entire surface of each prism light shielding surface 45. As a result, the light shielding layer 60 blocks light entering the prism light shielding surface 45 from the occupant side of the vehicle 1. The light shielding layer 60 also reduces interfacial reflection when light propagating inside the light guide 20 enters the prism light shielding surface 45. Although the light shielding layer 60 is made of black resin, it is not limited to black resin, and may be made of metal, for example.

A direction from the first rough surface 201 to the second rough surface 202 or a direction from the second rough surface 202 to the first rough surface 201 is referred to as a first direction Da1 perpendicular to the normal direction Dn. The first direction Da1 coincides with the up-down direction. The up-down direction is orthogonal to the front-rear direction and the left-right direction of the viewer.

The prism exit surface 42 and the prism light shielding surface 45 are inclined with respect to the first direction Da1 at an angle in the rotational direction about the axis extending in the normal direction Dn. Therefore, the first reflecting surface 31 and the light shielding layer 60 are inclined with respect to the first direction Da1 at an angle in the rotational direction about the axis extending in the normal direction Dn. The inclination angle of the prism exit surface 42 and the prism light shielding surface 45 with respect to the first direction Da1 in the rotational direction about the axis extending in the normal direction Dn is defined as a prism angle γ. The inclination angle of the first reflecting surface 31 in the rotational direction about the axis extending in the normal direction Dn is defined as a reflecting surface angle γr. The outer edge of the pillar 5 is inclined with respect to the first direction Da1 at an angle in the rotational direction about the axis extending in the normal direction Dn. The inclination angle of the pillar 5 with respect to the first direction Da1 in the rotational direction about the axis extending in the normal direction Dn is defined as a pillar angle Γ. The prism angle γ, the reflecting surface angle γr, and the pillar angle Γ are defined in the clockwise direction, but are not limited to, in the rotational direction about the axis extending in the normal direction Dn. The prism angle γ, the reflecting surface angle γr, and the pillar angle Γ may be defined in the counterclockwise direction, of the rotational direction about the axis extending in the normal direction Dn.

A direction perpendicular to the normal direction Dn and the first direction Da1 is defined as a second direction Da2. The second direction Da2 coincides with the front-rear direction of the viewer. Furthermore, the second direction Da2 coincides with the arrangement direction of the prisms 40.

Figure 5:
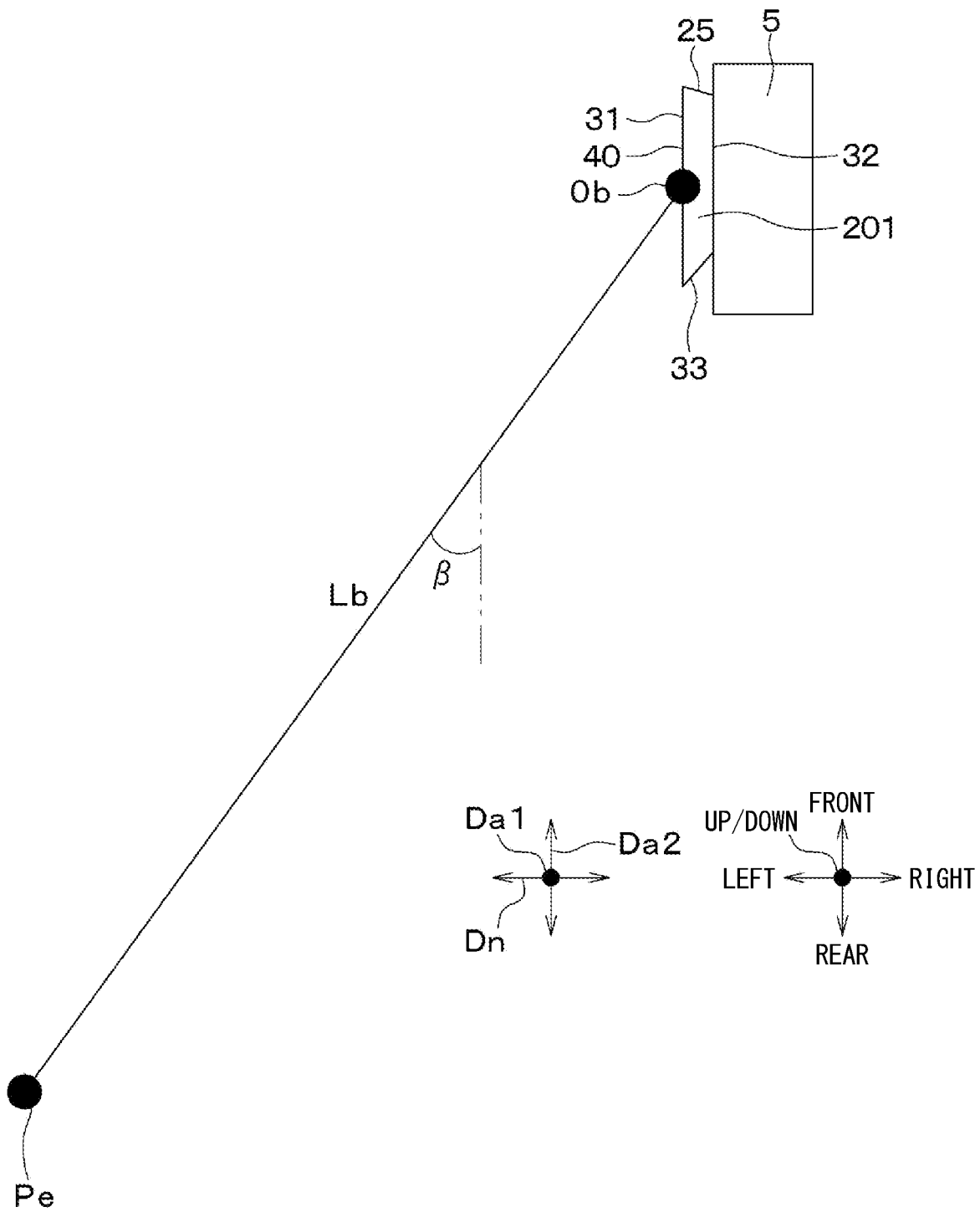
FIG. 5 is a schematic view illustrating the optical member, a pillar and an eyepoint.

As shown in FIG. 5, the center of the light guide 20 in the second direction Da2 is defined as a light guide center Ob. In the cross section of the light guide 20 perpendicular to the first direction Da1, a line segment connecting the viewer's eye point Pe and the light guide center Ob is defined as a guide line segment Lb. Since the first direction Da1 coincides with the up-down direction, the guide line segment Lb corresponds to a line segment connecting the viewer's eye point Pe and the light guide center Ob in the cross section of the light guide 20 perpendicular to the up-down direction. The inclination angle of the guide line segment Lb with respect to the second direction Da2 is defined as a relative angle β, in the rotational direction about the axis extending in the first direction Da1. The guide line segment Lb is a line segment connecting the viewer's eye point Pe and the light guide center Ob, but is not limited to this. The guide line segment Lb may be a line segment connecting an eyebox which is a predetermined area including the viewer's eye point Pe and the light guide center Ob.

Figure 6:
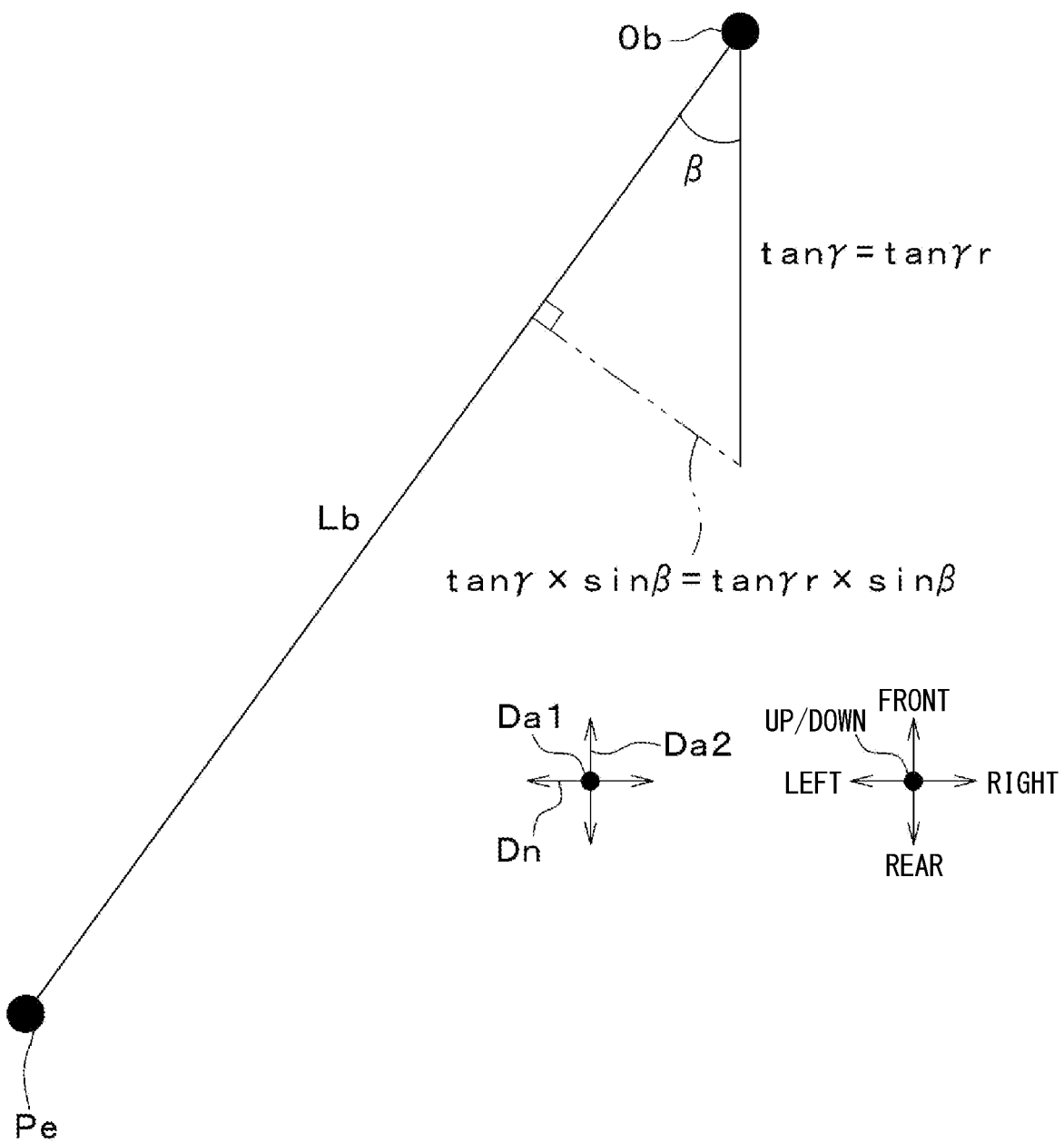
FIG. 6 is a diagram showing the amount of deviation when a viewer sees the optical member.

The prism angle γ is equal to or less than the pillar angle Γ, that is, γ≤Γ. Furthermore, since the prism angle γ is the same as the reflecting surface angle γr, the reflecting surface angle γr is equal to or less than the pillar angle Γ, that is, γr≤Γ. The prism exit surface 42 and the prism light shielding surface 45 are inclined with respect to the first direction Da1 at an angle in the rotational direction about the axis extending in the normal direction Dn. As a result, as shown in FIG. 6, when the viewer looks at the light guide center Ob, the prism exit surface 42 and the prism light shielding surface 45 look like being offset by the value of tan γ×sin β geometrically in a space in which the normal direction Dn and the second direction Da2 are in the Cartesian coordinate system. That is, when the viewer sees the light guide center Ob, the prism exit surface 42 and the prism light shielding surface 45 look like being offset by the value of tan γ×sin β geometrically in a space in which the front-rear direction and the left-right direction of the viewer are in the Cartesian coordinate system.

Therefore, when the viewer looks at the light guide 20, the prism exit surface 42 and the prism light shielding surface 45 appear to be tilted with respect to the first direction Da1 at an angle of arctan(tan γ×sin β) in the rotational direction around the axis extending in the normal direction Dn. The prism exit surface 42 and the prism light shielding surface 45 are formed so as to satisfy the following (Formula 1-2). Thus, the light shielding layer 60 covering the prism light shielding surface 45 is formed so as to satisfy the following (Formula 1-2). Since the prism angle γ and the reflecting surface angle γr are the same, the first reflecting surface 31 is formed so as to satisfy the following (Formula 1-3).

(Formula 1-2)

$$10° \leq \arctan(\tan \gamma \times \sin \beta) \leq 90° \quad (1\text{-}2)$$

(Formula 1-3)

$$10° \leq \arctan(\tan \gamma r \times \sin \beta) \leq 90° \quad (1\text{-}3)$$

Figure 7:
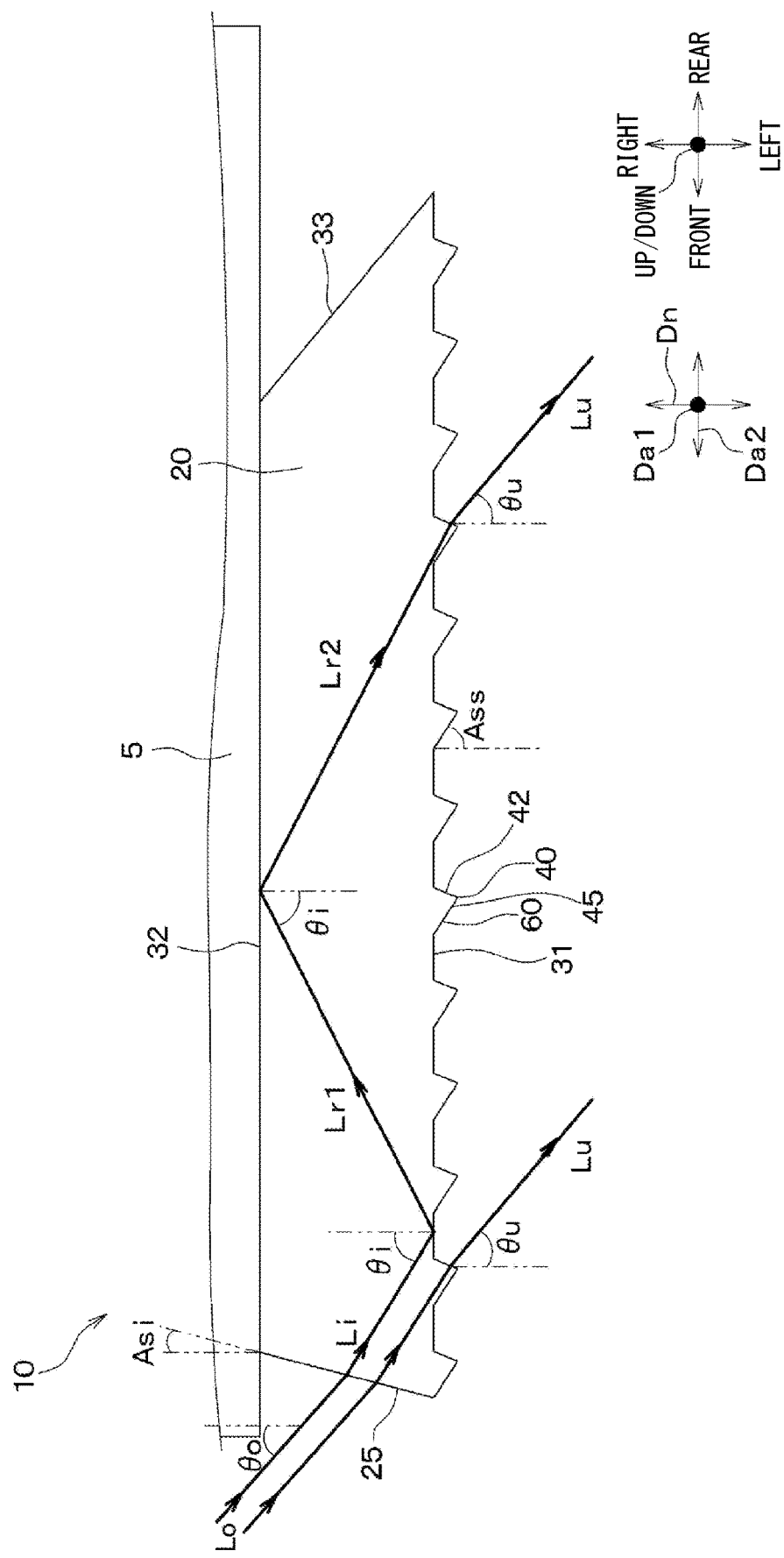
FIG. 7 is a schematic cross-sectional view showing a state in which an external scene light is incident on an incident surface of the optical member.

The optical member 10 of the first embodiment is constructed as described above. In the optical member 10 of the present embodiment, the sight in the blind spot area due to the pillars 5 is visible to the occupant of the vehicle 1, and the decrease in recognition of the sight in the blind spot area is suppressed. Next, with reference to FIG. 7, the visual recognition of the scene in the blind spot area will be described.

For example, when an external scene light Lo is incident on the incident surface 25 at an incident angle θo, it is refracted inside the light guide 20 to become incident light Li. Note that the incident angle θo is formed between the traveling direction of the external scene light Lo and the normal direction Dn.

Further, a part of the incident light Li travels toward the first reflecting surface 31 at the incident angle θi and reaches the first reflecting surface 31. The incoming incident light Li is totally reflected by the first reflecting surface 31 and becomes the first reflected light Lr1. The first reflected light Lr1 travels toward the second reflecting surface 32 at an incident angle θi and reaches the second reflecting surface 32. The reached first reflected light Lr1 is totally reflected by the second reflecting surface 32 and becomes a second reflected light Lr2. Furthermore, the second reflected light Lr2 travels toward the prism exit surface 42 and reaches the prism exit surface 42. The second reflected light Lr2 is emitted from the prism exit surface 42 at an exit angle θu that is the same as the incident angle θo, and becomes emergent light Lu. Then, as the emergent light Lu travels toward and reaches the occupant of the vehicle 1, the sight of the blind area due to the pillar 5 is visually recognized. The incident angle θi is formed between the traveling direction of the incident light Li and the normal direction Dn. The exit angle θu is formed between the traveling direction of the emergent light Lu and the normal direction Dn. Since Asi<π/2−θi is satisfied, the incident angle θi is larger than the incident angle θo. As a result, the incident light Li travels toward a wide range of the first reflecting surface 31. Furthermore, the inclination angle of the prism light shielding surface 45 with respect to the normal direction Dn is equal to or greater than the incident angle θo. Therefore, the emergent light Lu is emitted to the outside without being blocked by the prism light shielding surface 45, so that loss in the amount of the emission light is reduced.

A part of the incident light Li travels toward the prism exit surface 42 and reaches the prism exit surface 42. The incident light Li is emitted from the prism exit surface 42 at an exit angle θu that is the same as the incident angle θo, and becomes emergent light Lu. Then, as the emergent light Lu travels toward and reaches the occupant of the vehicle 1, the sight of the blind area due to the pillar 5 is visually recognized.

As described above, the occupant of the vehicle 1 can visually recognize the sight of the blind spot due to the pillar 5. Next, suppression of deterioration in recognition of the scene in the blind spot area will be described.

Figure 8:
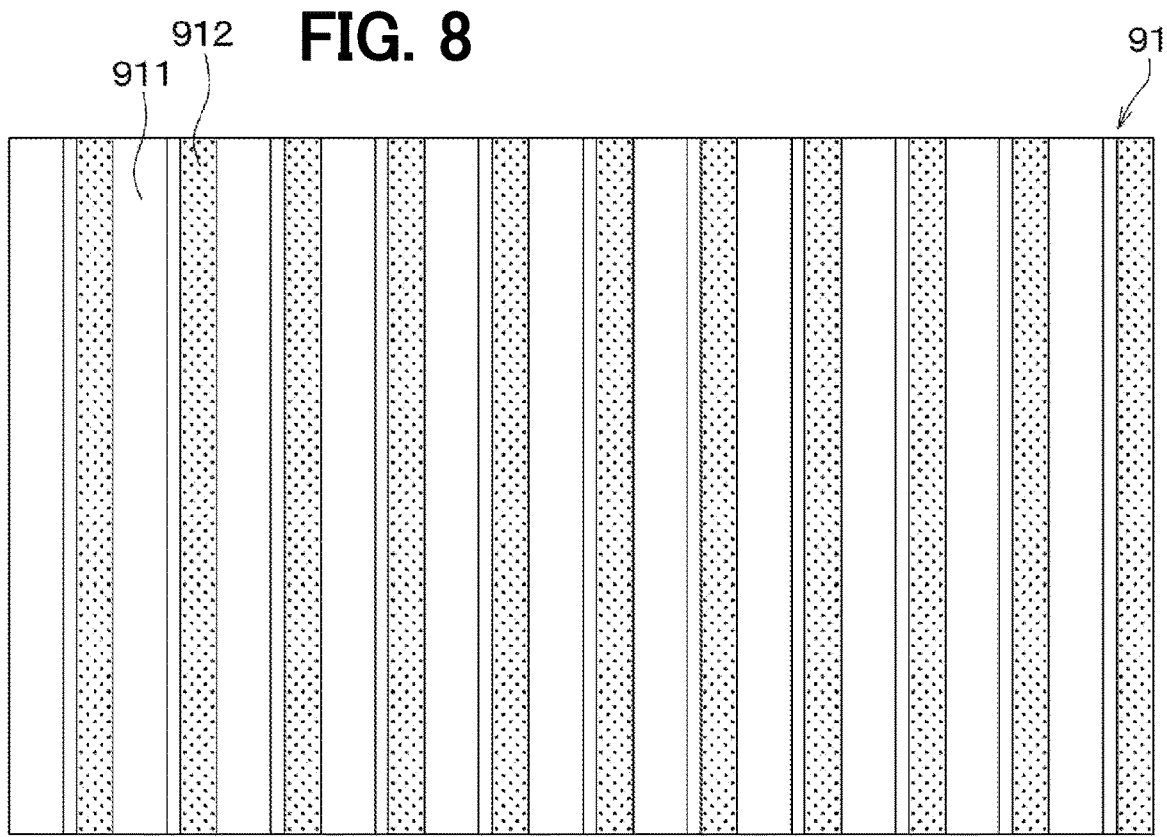
FIG. 8 is a schematic diagram of a comparison optical member.

The deterioration in recognition of the scene in the blind spot area will be described using a first comparison optical member 91. As shown in FIG. 8, the first comparison optical member 91 includes a first comparison prism 911 and a first comparison reflecting surface 912. The first comparison prism 911 protrudes from the first comparison reflecting surface 912 in the normal direction of the first comparison reflecting surface 912. The first comparison prism 911 extends in the up-down direction in FIG. 8 and the first comparison prisms 911 are arranged in the left-right direction in FIG. 8. The first comparison reflecting surface 912 is formed between the first comparison prisms 911 adjacent to each other. The first comparison reflecting surfaces 912 extend in the up-down direction in FIG. 8 and the first comparison reflecting surfaces 912 are arranged in the left-right direction in FIG. 8. Further, the light incident on the first comparison optical member 91 passes through the inside of the first comparison optical member 91 and is reflected by the first comparison reflecting surface 912. The light reflected by the first comparison reflecting surface 912 is reflected by the surface opposite to the first comparison reflecting surface 912, enters the first comparison prism 911, and is emitted from the first comparison prism 911. As a result, the scene in the blind spot area is visually recognized on the first comparison optical member 91. At this time, when the viewer looks at the first comparison optical member 91, the first comparison reflecting surfaces 912 look like streaks extending in the up-down direction and arranged in the left-right direction in FIG. 8. In FIG. 8, in order to clarify the location of the first comparison reflecting surface 912, the first comparison reflecting surface 912 is indicated by a dot pattern.

In case where the viewer sees the scenery, if there is a periodic streak in the up-down direction at a different distance from the scenery, the human visual processing will fuse to the streaks, since the viewer's eyes are on the left and right. Therefore, the attractiveness, which is the ease with which the viewer can recognize the streaks, increases. For this reason, it is impeded to fuse the scenery with the left and right vision. In addition, when moiré generated by the vertical stripes of the periodic structure moves due to the lateral movement of both eyes of the viewer, the attractiveness is increased. Thus, recognition of the scene in the blind spot area reflected in the first comparison optical member 91 is lowered.

In contrast, according to the optical member 10 of the first embodiment, the first reflecting surface 31 is formed so as to satisfy (Formula 1-3). As a result, when the viewer sees the light guide 20, the streaks formed by the first reflecting surface 31 appear to be inclined by 10 to 90 degrees with respect to the first direction Da1. For this reason, compared to a case where the streaks formed by the first reflecting surface 31 are not inclined with respect to the first direction Da1 or inclined by less than 10 degrees, the enhancement of the streaks is suppressed. Thus, the eye-attractiveness is lowered. Therefore, deterioration in recognition of the scene in the blind area reflected on the optical member 10 is suppressed. In addition, since the tilt seen by the viewer changes depending on the viewing position of the viewer, it becomes easier to set the optimum reflecting surface angle γr for reducing the eye-attractiveness based on (Formula 1-3).

The first embodiment also achieves the following effects.

Figure 9:
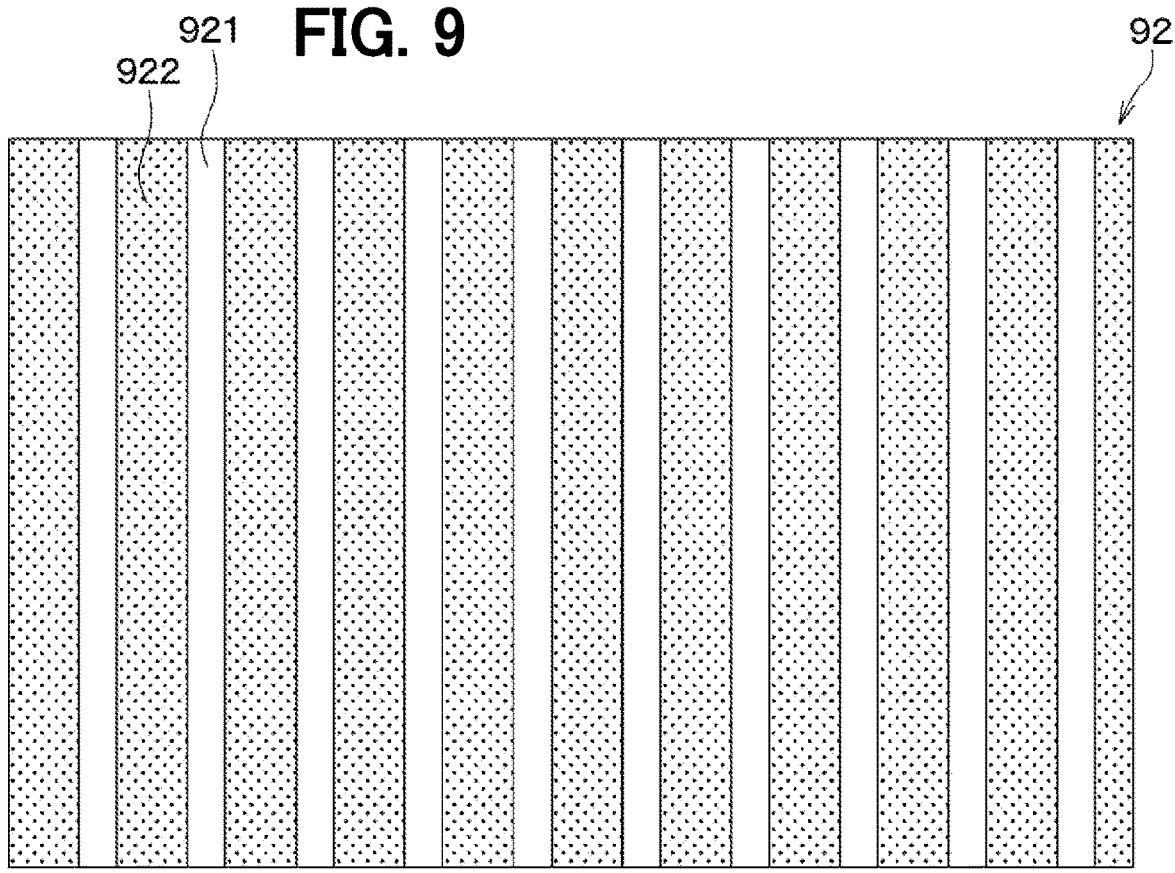
FIG. 9 is a schematic diagram of a comparison optical member.

[1-1] The decrease in recognition of the scene in the blind spot area will be described using a second comparison optical member 92. As shown in FIG. 9, the second comparison optical member 92 includes a second comparison prism 921 and a comparison light shielding layer 922. The second comparison prisms 921 extend in the up-down direction and are arranged in the left-right direction in FIG. 9. The comparison light shielding layer 922 covers one surface of the second comparison prism 921. The light incident on the second comparison optical member 92 passes through the inside of the second comparison optical member 92, enters the second comparison prism 921, and exits from the second comparison prism 921. As a result, the scene in the blind spot area is visually recognized in the second comparison optical member 92. At this time, when the viewer looks at the second comparison optical member 92, the comparison light shielding layers 922 look like multiple lines extending in the up-down direction and arranged in the left-right direction. Similar to the above, these streaks increase the eye-attractiveness, which is the ease with which the viewer can recognize the streaks, so that the visibility of the scene in the blind area reflected on the first comparison optical member 91 is reduced. In FIG. 9, the comparison light shielding layer 922 is indicated by a dot pattern in order to clarify the location of the comparison light shielding layer 922.

In contrast, according to the optical member 10 of the first embodiment, the prism light shielding surface 45 and the light shielding layer 60 are formed so as to satisfy (Formula 1-2). As a result, for example, when the viewer looks at the light guide 20, the streaks formed by the light shielding layer 60 covering the prism light shielding surface 45 appear to be inclined by 10 to 90 degrees with respect to the first direction Da1. Therefore, compared to a case where the streaks formed by the light shielding layer 60 are not inclined with respect to the first direction Da1 or are tilted at an angle of less than 10 degrees, the emphasis of the streaks is suppressed, thereby reducing the eye-attractiveness. Therefore, deterioration in recognition of the scene in the blind area reflected on the optical member 10 is suppressed. Further, since the tilt seen by the viewer changes depending on the viewing position of the viewer, it becomes easier to set the optimum prism angle γ for reducing the eye-attractiveness based on (Formula 1-2).

[1-2] The prism angle γ is equal to or less than the pillar angle Γ, that is, γ≤Γ. Also, the reflecting surface angle γr is equal to or less than the pillar angle Γ, that is, γr≤Γ. These make it difficult for the light guide 20 to protrude from the pillar 5 in the second direction Da2. Therefore, the light guide 20 is less likely to come into contact with the outside of the pillar 5 such as the windshield 3.

Second Embodiment

In the second embodiment, the light guide 20 is different from that in the first embodiment. The other configurations are the same as those of the first embodiment.

Figure 10:
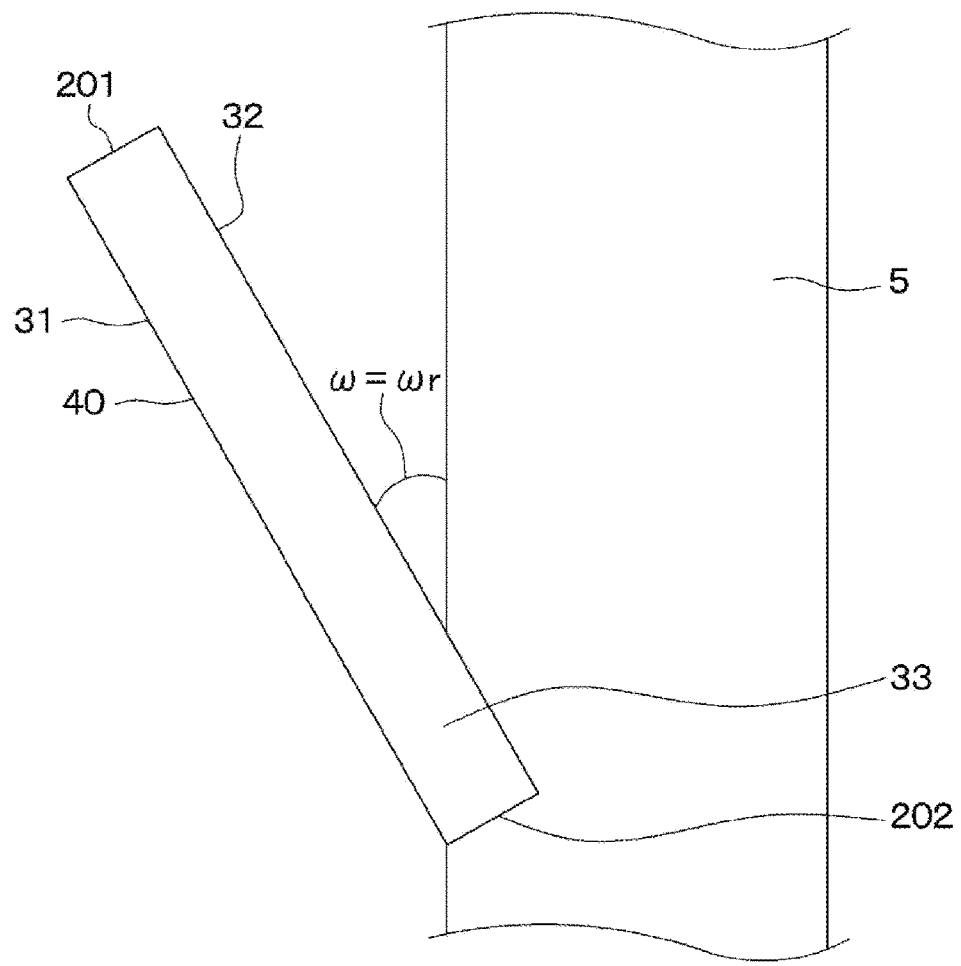
FIG. 10 is a side view of an optical member according to a second embodiment.

Specifically, as shown in FIG. 10, the prism exit surface 42 and the prism light shielding surface 45 are inclined with respect to the up-down direction at an angle in the rotational direction about the axis extending in the second direction Da2. Therefore, the light guide 20 itself is inclined with respect to the up-down direction at an angle in the rotational direction about the axis extending in the second direction Da2. The normal direction Dn and the first direction Da1 intersect with the up-down direction and the left-right direction.

The inclination angle of the prism exit surface 42 and the prism light shielding surface 45 with respect to the up-down direction is defined as a first prism angle γ in the rotational direction about the axis extending in the left-right direction of the viewer. The inclination angle of the prism exit surface 42 and the prism light shielding surface 45 with respect to the up-down direction is defined as a second prism angle ω in the rotational direction about the axis extending in the second direction Da2. The inclination angle of the first reflecting surface 31 with respect to the up-down direction is defined as a first reflecting surface angle γr in the rotational direction about the axis extending in the left-right direction of the viewer. The inclination angle of the first reflecting surface 31 with respect to the up-down direction is defined as a second reflecting surface angle ωr in the rotational direction about the axis extending in the second direction Da2. The first prism angle γ corresponds to the prism angle γ and is the same as the first reflecting surface angle γr. The second prism angle ω is the same as the second reflecting surface angle ωr. The first reflecting surface angle γr corresponds to the reflecting surface angle γr. The second direction Da2 coincides with the front-rear direction of the viewer. The first prism angle γ and the first reflecting surface angle γr are not limited to be defined in the clockwise direction about the axis extending in the left-right direction of the viewer, but may be an angle in the counterclockwise direction, of the rotational direction around the axis extending in the left-right direction of the viewer. The second prism angle ω and the second reflecting surface angle ωr are not limited to be defined in the counterclockwise direction about the axis extending in the second direction Da2, but may be an angle in the clockwise direction, of the rotational direction about the axis extending in the second direction Da2. The pillar angle Γ is not limited to be defined in the clockwise direction around the axis extending in the left-right direction of the viewer, but may be an angle in the counterclockwise direction around the axis extending in the left-right direction of the viewer.

Figure 11:
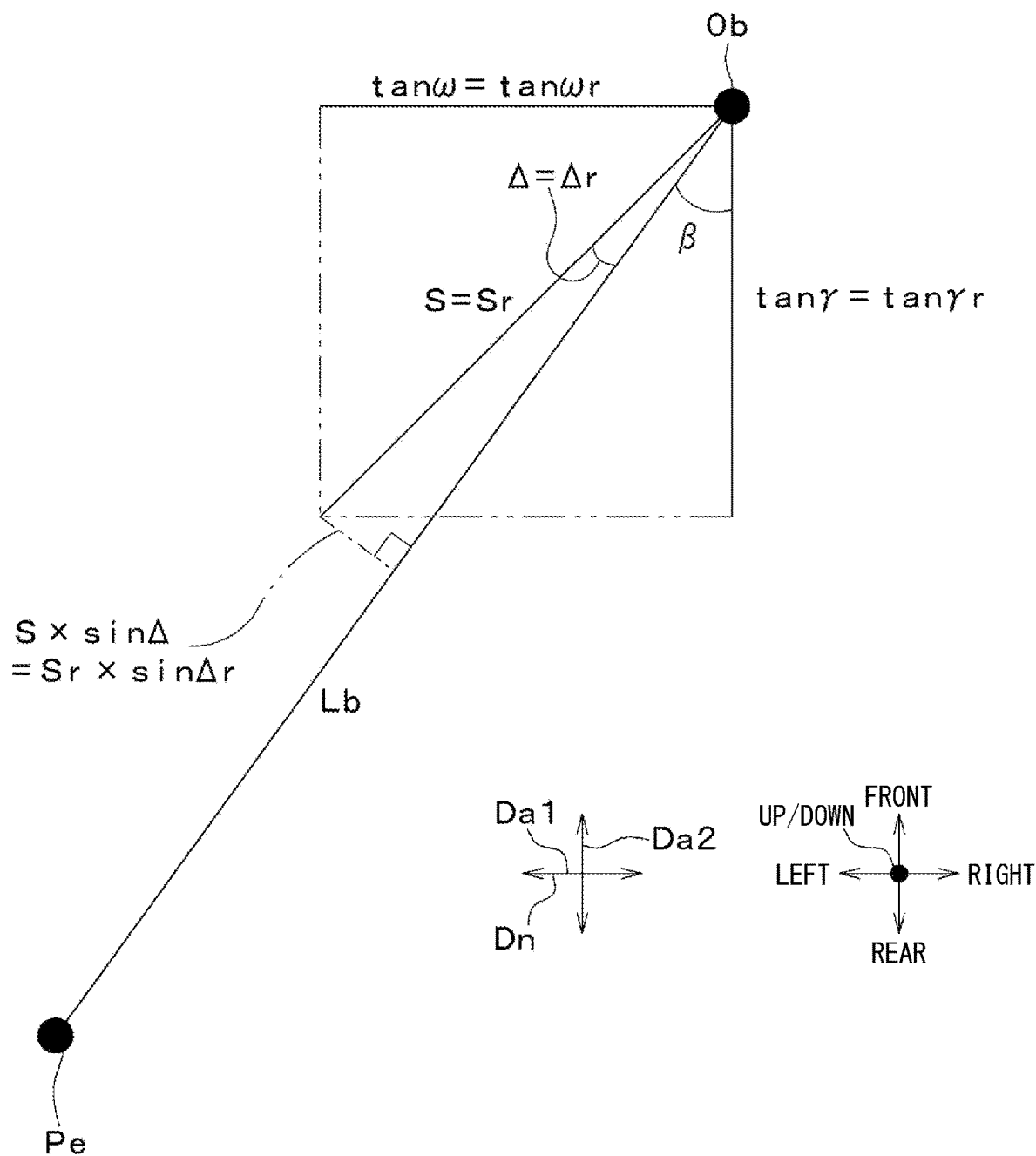
FIG. 11 is diagram showing the amount of deviation when a viewer sees the optical member.

The center of the light guide 20 in the second direction Da2 is defined as the light guide center Ob. As shown in FIG. 11, a line segment connecting the viewer's eye point Pe and the light guide center Ob in the cross section of the light guide 20 orthogonal to the up-down direction is defined as a guide line segment Lb. The inclination angle of the guide line segment Lb with respect to the second direction Da2 is defined as a relative angle β in the rotational direction about the axis extending in the up-down direction.

The prism exit surface 42 and the prism light shielding surface 45 are inclined at an angle in the rotational direction about the axis extending in the second direction Da2. As a result, when the viewer sees the light guide center Ob, the prism exit surface 42 and the prism light shielding surface 45 look like geometrically being shifted by the value of S×sin Δ in the space in which the front-rear direction and the left-right direction of the viewer are defined as the Cartesian coordinate system. Note that S is a distance corresponding to the first prism angle γ and the second prism angle ω with respect to the light guide center Ob, and is represented as in (Formula 2-1) using the first prism angle γ and the second prism angle ω. In addition, Δ is an angle in the rotational direction around the axis extending in the up-down direction when the viewer sees the light guide center Ob, and is represented as in (Formula 2-2) using the relative angle β, the first prism angle γ, and the second prism angle ω. The unit of Δ is degrees.

Therefore, when the viewer looks at the light guide 20, the prism exit surface 42 and the prism light shielding surface 45 look like being vertically slanted at an angle of arctan(S×sin Δ) in the rotational direction around the axis extending in the left-right direction of the viewer. The prism exit surface 42 and the prism light shielding surface 45 are formed so as to satisfy (Formula 2-3). Thus, the light shielding layer 60 is formed so as to satisfy (Formula 2-3).

Since the first prism angle γ and the first reflecting surface angle γr are the same, when the viewer looks at the light guide center Ob, the first reflecting surface 31 looks like being geometrically shifted by the value of Sr×sin Δr in the space in which the front-rear direction and the left-right direction of the viewer are defined as the Cartesian coordinate system. Note that Sr is a distance corresponding to the first reflecting surface angle γr and the second reflecting surface angle ωr with respect to the light guide center Ob, and is represented by (Formula 2-4) using the first reflecting surface angle γr and the second reflecting surface angle ωr. Also, Δr is an angle in the rotational direction around the axis extending in the up-down direction when the viewer looks at the light guide center Ob, and is represented by (Formula 2-5) using the relative angle β, the first reflecting surface angle γr, and the second reflecting surface angle ωr. The unit of Δr is degrees.

Therefore, when the viewer looks at the light guide 20, the first reflecting surface 31 looks like being inclined with respect to the up-down direction at an angle of arctan(Sr×sin Δr) in the rotational direction about the axis extending in the left-right direction of the viewer. The first reflecting surface 31 is formed so as to satisfy (Formula 2-6).

(Formula 2 – 1)
$$S = \sqrt{\tan^2\omega + \tan^2\gamma} \qquad (2-1)$$
(Formula 2 – 2)
$$\Delta = \arctan\left(\frac{\tan\omega}{\tan\gamma}\right) - \beta \qquad (2-2)$$
(Formula 2 – 3)
$$10° \leq \arctan(S \times \sin\Delta) \leq 90° \qquad (2-3)$$
(Formula 2 – 4)
$$Sr = \sqrt{\tan^2\omega r + \tan^2\gamma r} \qquad (2-4)$$
(Formula 2 – 5)
$$\Delta r = \arctan\left(\frac{\tan\omega r}{\tan\gamma r}\right) - \beta \qquad (2-5)$$
(Formula 2 – 6)
$$10° \leq \arctan(Sr \times \sin\Delta r) \leq 90° \qquad (2-6)$$

The optical member 10 of the second embodiment is constructed as described above. The second embodiment also achieves the same effects as achieved by the first embodiment.

Third Embodiment

In the third embodiment, as shown in FIG. 12, the first rough surface 201 and the second rough surface 202 are perpendicular to the up-down direction. The others are similar to those of the second embodiment. Also, in the third embodiment, the same effects as those of the second embodiment are exerted. Moreover, in the third embodiment, the following effects are further obtained.

[2] The first rough surface 201 and the second rough surface 202 are perpendicular to the up-down direction. As a result, the length of the light guide 20 in the up-down direction becomes shorter compared with a case where the first rough surface 201 and the second rough surface 202 are not perpendicular to the up-down direction. Therefore, an increase in the size of the light guide 20 is suppressed.

Fourth Embodiment

In the fourth embodiment, the light guide 20 does not have the first reflecting surface 31 and the second reflecting surface 32 but has a half mirror 311 and a reflecting surface 321. The prism 40 is different from that of the first embodiment. The other configurations are the same as those of the first embodiment.

The half mirror 311 includes a dielectric multilayer film or the like, to reflect a part of the light incident on the half mirror 311, and transmits a part of the light incident on the half mirror 311. The surface on which light is reflected by the half mirror 311 corresponds to the first reflecting surface 31, and the normal direction Dn corresponds to a normal direction to the surface on which light is reflected by the half mirror 311. As shown in FIG. 13, the half mirror 311 intersects the incident surface 25 and is arranged between the prism 40 and the reflecting surface 321, which will be described later, in the normal direction Dn.

The reflecting surface 321 corresponds to the second reflecting surface 32. The reflecting surface 321 is connected to the incident surface 25 on the side opposite to the first reflecting surface 31, and is parallel to the half mirror 311. Furthermore, the light reflected by the half mirror 311 is reflected on the second reflecting surface 32.

Since the light guide 20 does not have the first reflecting surface 31 but has the half mirror 311, the prisms 40 are arranged in a row in the second direction Da2. The prism exit surface 42 and the prism light shielding surface 45 are formed so as to satisfy (Formula 1-2). Thus, the light shielding layer 60 is formed so as to satisfy (Formula 1-2).

The optical member 10 of the fourth embodiment is constructed as described above. The fourth embodiment also provides effects similar to the effects in the first embodiment.

Other Embodiments

The present disclosure is not limited to the above-described embodiments, and the above embodiment can be appropriately modified. Further, in each of the embodiments, it goes without saying that components of the embodiment are not necessarily essential except for a case in which the components are particularly clearly specified as essential components, a case in which the components are clearly considered in principle as essential components, and the like.

In each of the embodiments, the prism 40 has a triangular prism shape, but is not limited to a triangular prism shape. The prism 40 may have, for example, a trapezoidal prism shape.

In each of the embodiments, the light shielding layer 60 is formed of a light absorbing film, but is not limited to being formed of a light absorbing film. The light shielding layer 60 may be formed of a light diffusing material, a retroreflecting material, or the like.

In each of the embodiments, the light guide 20 has the prism 40, but is not limited to this. The light guide 20 may have a diffraction grating or a hologram, instead of the prism 40. Further, an incident prism, a diffraction grating, or a hologram may be formed on the incident surface 25 of the light guide 20.

In the first to third embodiments, the second reflecting surface 32 is parallel to the first reflecting surface 31. The second reflecting surface 32 is not limited to being parallel to the first reflecting surface 31, and may not be parallel to the first reflecting surface 31 according to the distance from the optical member 10 to the viewer. In the fourth embodiment, the reflecting surface 321 is parallel to the half mirror 311. The reflecting surface 321 is not limited to being parallel to the half mirror 311, and may not be parallel to the half mirror 311 depending on the distance from the optical member 10 to the viewer.

The above-described embodiments may be combined as appropriate.

What is claimed is:

1. An optical member to be attached to a mounting member comprising
    a light guide having
    an incident surface on which an external scene light is incident from a blind area,
    a first reflecting surface configured to reflect light from the incident surface,
    a second reflecting surface configured to reflect light reflected by the first reflecting surface,
    an exit portion that emits the light from the incident surface and the light reflected by the second reflecting surface to outside,
    a first rough surface cross-connected with the incident surface, the first reflecting surface, and the second reflecting surface, and
    a second rough surface cross-connected with the first reflecting surface and the second reflecting surface, the second rough surface being located opposite to the first rough surface,
    a first direction is defined from the first rough surface to the second rough surface and perpendicular to a normal direction of the first reflecting surface,
    a second direction is perpendicular to the normal direction and the first direction,
    the exit portion is one of a plurality of exit portions arranged at a predetermined interval in the second direction,
    the first reflecting surface is defined between the exit portions adjacent to each other, and the first reflecting surface is one of a plurality of first reflecting surfaces arranged at a predetermined interval in the second direction,
    an inclination angle $\gamma r$ of the first reflecting surface with respect to the first direction is defined in a rotational direction about an axis extending in the normal direction,
    a line segment Lb is defined by connecting a viewer and the light guide in a cross section perpendicular to the first direction,
    an inclination angle $\beta$ of the line segment Lb with respect to the second direction is defined in a rotational direction about an axis extending in the first direction, and
    the first reflecting surface is formed so as to satisfy Inequation of $10° \le \arctan(\tan \gamma r \times \sin \beta) \le 90°$.

2. The optical member according to claim 1, wherein
    an inclination angle $\Gamma$ of the mounting member with respect to the first direction is defined in a rotational direction about an axis extending in the normal direction, and
    the light guide is formed so as to satisfy Inequation of $\gamma r \le \Gamma$.

3. An optical member to be attached to a mounting member comprising
    a light guide having
    an incident surface on which an external scene light is incident from a blind area,
    a first reflecting surface configured to reflect light from the incident surface,
    a second reflecting surface configured to reflect light reflected by the first reflecting surface,
    an exit portion having an exit surface that emits the light from the incident surface and the light reflected by the second reflecting surface to outside, and a non-exit surface connected to the exit surface,
    a first rough surface cross-connected with the incident surface, the first reflecting surface, and the second reflecting surface,
    a second rough surface cross-connected with the first reflecting surface and the second reflecting surface, the second rough surface being located opposite to the first rough surface, and
    a light shielding portion covering the non-exit surface to shield light directed toward the exit portion from outside of the light guide, wherein
    a first direction is defined from the first rough surface to the second rough surface and perpendicular to a normal direction of the first reflecting surface,
    a second direction is perpendicular to the normal direction and the first direction,
    the exit portion is one of a plurality of exit portions arranged in the second direction,
    the light shielding portion covering the non-exit surface is one of a plurality of light shielding portions arranged in the second direction,
    an inclination angle $\gamma$ of the non-exit surface and the light shielding portion with respect to the first direction is defined in a rotational direction about an axis extending in the normal direction,
    a line segment Lb is defined by connecting a viewer and the light guide in a cross section perpendicular to the first direction,
    an inclination angle $\beta$ of the line segment Lb with respect to the second direction is defined in a rotational direction about an axis extending in the first direction, and
    the non-exit surface and the light shielding portion are formed so as to satisfy Inequation of $10° \le \arctan(\tan \gamma \times \sin \beta) \le 90°$.

4. The optical member according to claim 3, wherein
    an inclination angle $\Gamma$ of the mounting member with respect to the first direction is defined in a rotational direction about an axis extending in the normal direction, and
    the light guide is formed so as to satisfy Inequation of $\gamma \le \Gamma$.

5. The optical member according to claim 3, wherein
    the first direction coincides with an up-down direction,
    the second direction coincides with a front-rear direction of the viewer, and the normal direction coincides with a left-rear direction of the viewer.

6. An optical member to be attached to a mounting member comprising a light guide having an incident surface on which an external scene light is incident from a blind area, a first reflecting surface configured to reflect light from the incident surface, a second reflecting surface configured to reflect light reflected by the first reflecting surface, an exit portion that emits the light from the incident surface and the light reflected by the second reflecting surface to outside, a first rough surface cross-connected with the incident surface, the first reflecting surface, and the second reflecting surface, and a second rough surface cross-connected with the first reflecting surface and the second reflecting surface, the second rough surface being located opposite to the first rough surface, a first direction is defined from the first rough surface to the second rough surface and perpendicular to a normal direction of the first reflecting surface, a second direction is perpendicular to the normal direction and the first direction, the exit portion is one of a plurality of exit portions arranged at a predetermined interval in the second direction, the first reflecting surface is defined between the exit portions adjacent to each other, and the first reflecting surface is one of a plurality of first reflecting surfaces arranged at a predetermined interval in the second direction, an inclination angle $\omega r$ of the first reflecting surface with respect to an up-down direction is defined in a rotational direction about an axis extending in a front-rear direction of a viewer, an inclination angle $\gamma r$ of the first reflecting surface with respect to the up-down direction is defined in a rotational direction about an axis extending in a left-right direction of the viewer, a line segment Lb is defined by connecting the viewer and the light guide in a cross section perpendicular to the up-down direction, an inclination angle $\beta$ of the line segment Lb with respect to the front-rear direction is defined in a rotational direction about an axis extending in the up-down direction, and the first reflecting surface is formed so as to satisfy $$Sr = \sqrt{\tan^2\omega r + \tan^2\gamma r} \qquad (3-1)$$

$$\Delta r = \arctan\left(\frac{\tan\omega r}{\tan\gamma r}\right) - \beta \qquad (3-2)$$

and $$10° \leq \arctan(Sr \times \sin\Delta r) \leq 90°. \qquad (3-3)$$

7. The optical member according to claim 6, wherein an inclination angle $\Gamma$ of the mounting member with respect to the up-down direction is defined in a rotational direction about an axis extending in the left-right direction, and the light guide is formed so as to satisfy Inequation of $\gamma r \leq \Gamma$.

8. An optical member to be attached to a mounting member comprising a light guide having an incident surface on which an external scene light is incident from a blind area, a first reflecting surface configured to reflect light from the incident surface, a second reflecting surface configured to reflect light reflected by the first reflecting surface, an exit portion having an exit surface that emits the light from the incident surface and the light reflected by the second reflecting surface to outside and a non-exit surface connected to the exit surface, a first rough surface cross-connected with the incident surface, the first reflecting surface, and the second reflecting surface, a second rough surface cross-connected with the first reflecting surface and the second reflecting surface, the second rough surface being located opposite to the first rough surface, and a light shielding portion covering the non-exit surface to shield light directed toward the exit portion from outside of the light guide, wherein a first direction is defined from the first rough surface to the second rough surface and perpendicular to a normal direction of the first reflecting surface, a second direction is perpendicular to the normal direction and the first direction, the exit portion is one of a plurality of exit portions arranged in the second direction, the light shielding portion covering the non-exit surface is one of a plurality of light shielding portions arranged in the second direction, an inclination angle $\omega$ of the non-exit surface and the light shielding portion with respect to an up-down direction is defined in a rotational direction about an axis extending in a front-rear direction of a viewer, an inclination angle $\gamma$ of the non-exit surface and the light shielding portion with respect to the up-down direction is defined in a rotational direction about an axis extending in a left-right direction of the viewer, a line segment Lb is defined by connecting the viewer and the light guide in a cross section perpendicular to the up-down direction, an inclination angle $\beta$ of the line segment Lb with respect to the front-rear direction is defined in a rotational direction about an axis extending in the up-down direction, and the non-exit surface and the light shielding portion are formed so as to satisfy $$S = \sqrt{\tan^2\omega + \tan^2\gamma} \qquad (4-1)$$

$$\Delta = \arctan\left(\frac{\tan\omega}{\tan\gamma}\right) - \beta \qquad (4-2)$$

and $$10° \leq \arctan(S \times \sin\Delta) \leq 90°. \qquad (4-3)$$

9. The optical member according to claim 8, wherein an inclination angle $\Gamma$ of the mounting member with respect to the up-down direction is defined in a rotational direction about an axis extending in the left-right direction, and the light guide is formed so as to satisfy Inequation of $\gamma \leq \Gamma$.

10. The optical member according to claim 8, wherein the first rough surface and the second rough surface are perpendicular to the up-down direction.

11. The optical member according to claim 8, wherein the second direction coincides with the front-rear direction.

* * * * *